United States Patent [19]

Kashima et al.

[11] Patent Number: 4,944,705

[45] Date of Patent: Jul. 31, 1990

[54] TILT DAMPER

[75] Inventors: Mitsuhiro Kashima; Nobumichi Hanawa, both of Kani, Japan

[73] Assignee: Kayaba Kogyo Kabushiki Kaisha, Tokyo, Japan

[21] Appl. No.: 256,898

[22] Filed: Oct. 13, 1988

[30] Foreign Application Priority Data

| Oct. 26, 1987 | [JP] | Japan | 62-270027 |
| Nov. 12, 1987 | [JP] | Japan | 62-286222 |
| Nov. 12, 1987 | [JP] | Japan | 62-286224 |
| Feb. 10, 1988 | [JP] | Japan | 63-29667 |
| Apr. 13, 1988 | [JP] | Japan | 63-49795[U] |
| Jun. 7, 1988 | [JP] | Japan | 63-75432[U] |
| Jul. 28, 1988 | [JP] | Japan | 63-100001[U] |

[51] Int. Cl.$^5$ .......................................... B63H 5/12
[52] U.S. Cl. .................................... 440/61; 188/299; 188/300; 188/322.13; 188/322.15; 188/314; 267/64.12; 267/64.15
[58] Field of Search ............ 267/64.11–64.28; 188/299, 269, 279, 281, 282, 283, 284, 285, 289, 300, 311–319, 321.11, 322.13, 322.14, 322.15, 322.22; 440/61, 56, 53, 55

[56] References Cited

U.S. PATENT DOCUMENTS

| 3,795,291 | 3/1974 | Naito et al. | 188/315 X |
| 3,863,592 | 2/1975 | Borst | 440/61 |
| 3,885,517 | 5/1975 | Borst et al. | 440/61 X |
| 4,096,820 | 6/1978 | Hall | 440/56 |
| 4,159,756 | 7/1979 | Murakami et al. | 188/319 |
| 4,308,018 | 12/1981 | Nakamura et al. | 440/61 |
| 4,325,700 | 4/1982 | Kern et al. | 440/56 X |
| 4,428,566 | 1/1984 | DeBaan et al. | 267/64.15 |
| 4,445,671 | 5/1984 | Reuschenbach et al. | 267/64.12 |
| 4,445,673 | 5/1984 | Clark | 188/299 X |
| 4,493,659 | 1/1985 | Iwashita | 440/61 |
| 4,521,202 | 6/1985 | Nakahama | 440/56 X |
| 4,529,180 | 7/1985 | Hill | 188/315 X |
| 4,551,104 | 11/1985 | Iwashita et al. | 440/61 X |
| 4,605,377 | 8/1986 | Wenstadt | 440/61 X |
| 4,752,062 | 6/1988 | Domenichini | 188/299 X |
| 4,784,625 | 11/1988 | Nakahama | 440/56 X |

Primary Examiner—Douglas C. Butler
Attorney, Agent, or Firm—Jordan and Hamburg

[57] ABSTRACT

The invention consists of a novel tilt damper equipped with two oil chambers; one in the piston-rod extended position and the other in the piston-rod retracted position, which are respectively connected to a gas chamber through an oil passage where a relief valve and a check valve are provided. These valves are alternatively disengaged from the closed condition by an external operator. When these valves are open, oil flows freely into and out of them to allow gas pressure to drive the piston rod in the direction of extension. When only the check valve on the piston-rod oil chamber in the extended position is open, the tilt damper does not move in the direction of retraction. When overload is applied in the direction of extension of the piston rod, the tilt damper extends by applying a negative pressure to the oil chamber on the retraction part. When the overload is removed, the tilt damper automatically returns to the original position. When both valves are closed, the piston is locked by oil pressure to prevent the piston rod from moving in either directions.

31 Claims, 7 Drawing Sheets

TILT DAMPER

BACKGROUND OF THE INVENTION

The present invention relates to a tilt damper which securely supports a propelling apparatus externally attached to the stern of a boat at a given angle or provides a supplementary load to the tilting operation of the external propelling device.

The optimum angle for the support of the propelling device externally attached to the stern of a boat varies according to the navigation conditions. It is essential for navigators to securely support the propeller by raising its position so that it can not be subjected to unnecessary shock even when the boat hits submerged obstacles while being towed along the shore. In addition, when towing the boat onshore, it is desirable for the navigator to smoothly tilt the propeller to fully raise it above the water line by inverting its position.

To satisfy these requirements, conventionally, the propeller attached externally to the stern of a boat is supported by a tilt damper. The external propelling device is rotatable and is attached to the stern of the boat by the tilt damper, while the installation angle of the external propelling device is determined by the extended or retracted position of the tilt damper.

One of those conventional tilt damper is specified by the Japanese Patent Publication No. 59-5480 corresponding to the U.S. Pat. Ser. No. No.339,587, which was filed on Mar. 9, 1973, now U.S. Pat. No. 3,863,592.

The above device features the following: Oil and compressed gas are sealed inside the damper cylinder. The piston divides the interior of the damper cylinder into two oil chambers. The orifice and relief valve connecting these oil chambers are provided for the piston in parallel with each other. In response to the internal gas pressure, the piston is subjected to a certain force which causes the piston rod to constantly extend outward in order that the external propelling device can be smoothly rotated against its own weight.

If the external propelling device hits floating obstacles during navigation, the relief valve instantly opens and oil flows from one oil chamber to the other to enable the tilt damper to extend, thus eventually preventing the external propelling device from preventing the external propelling device from incurring external impacts. As soon as the boat is clear from the obstacle, oil is pumped back to the oil chamber through the orifice and the tilt damper can retracts to its original position.

Nevertheless, since the two oil chambers of the tilt damper are continuously interconnected through the orifice to allow the piston to freely reciprocate, a fixed angle cannot optionally be set in the installation of the external propelling device at the stern of the boat. Furthermore, an additional locking mechanism is necessary for securing the external propelling device to the boat at a predetermined angle.

In addition, the locking mechanism was to be used in conjunction with an additional mechanism for the automatic disengagement of the external propelling device to allow the tilt damper to extend as soon as the external propelling device incurs an external impact.

On the other hand, when halting the boat or reversing the rotation of the external propelling device for a reverse course, the damper cylinder is subjected to a tensile force acting in a direction opposite to that generated when the boat moves forward. This leads the damper to extend in the same way as in the case where the boat hits a floating or submerged obstacle. In other words, the conventional tilt damper mechanism cannot securely support the external propelling device when the rotation is reversed.

SUMMARY OF THE INVENTION

The primary object of the invention is to provide a novel tilt damper which can safely support the external propelling device installed on a boat at a predetermined optional angle.

The other object of the invention is to provide a novel tilt damper which can safely support the external propelling device of a boat moving astern backward.

To achieve those objects mentioned above, the invention provides the internal space of the tilt damper cylinder with a piston which slides freely therein. One end of the piston rod connected to the piston protrudes from the cylinder. A negative load is provided between the cylinder and the piston rod. The cylinder is subdivided into two oil chambers separated by both lateral surfaces of the piston. One of these is "the retraction-side" oil chamber which contracts when the piston rod moves in the retraction direction. The other is the "extension-side" oil chamber which contracts when the piston rod moves in the extension direction. Independent of these oil chambers, a gas chamber containing sealed gas is also provided. The passage connecting these oil chambers to the gas chamber is equipped with a first and a second valve which respectively prevent a surge of the fluid from these oil chambers to the gas chamber. In addition, the tilt damper related to the invention is provided with means for a controlled disengagement of both or either of these valves from the closed position.

When the first and second valves are compulsorily opened by the selective-valve-releasing means, oil flows freely through the two oil chambers and enables the piston to move freely. As a result, in response to the inner gas pressure, the piston rod extends outwards while this condition is present, the operator can adjust correctly the angle for the installation of the external propelling device and raise this device merely by applying a slight force.

For a compulsory opening of the second valve and a closing of the retraction-side oil chamber using the direction furthermore, a compressive load is applied to the piston rod while the boat moves forward, where the piston rod is immobilized exactly at the position dictated by the application of the compressive load.

Nevertheless, since oil flows out of the extension-side oil chamber through the second valve, the piston rod can move to the extension-side oil chamber against the inner pressure of the gas chamber. When a load is applied to the extension-side oil chamber, the piston rod extends outwards. This causes the retraction-side oil chamber to generate a negative pressure. To compensate for this, after absorbing the impact, the piston returns automatically to its original position.

When both the first and second valves are returned to the closed position by handling the operating means, the piston can neither move to the retraction-side oil chamber nor to the extension-side oil chamber. Consequently, the movement of the piston rod is impeded even when the piston rod acted upon by a load from the extension-side oil chamber.

Other object, features, and advantages of the invention will be better understood from the detailed description accompanying the following drawings.

DESCRIPTION OF THE PREFERRED EMBODIMENTS

Figure 1:
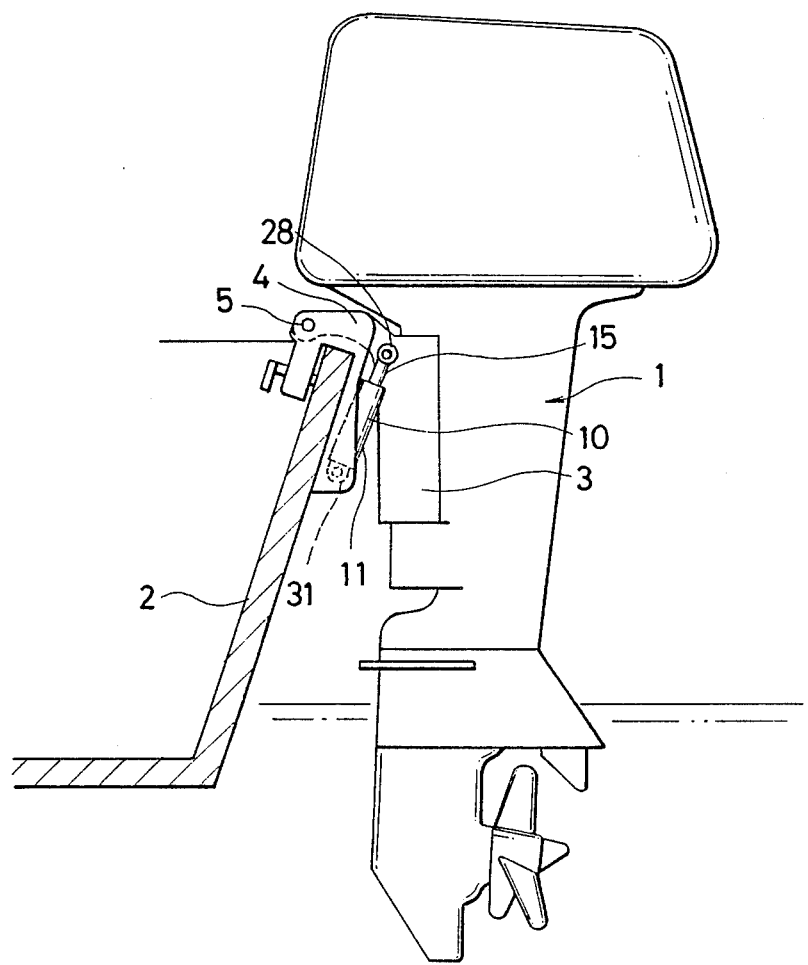
FIG. 1 is the lateral view of the external propelling device attached to the stern of a boat by means of the tilt damper related to the invention.

FIGS. 1 through 7 represent respectively concrete preferred embodiments of the tilt damper used for securing the external propelling device to the stern of a boat. The external propelling device shown in FIG. 1 is attached to the stern of boat 2 by means of a swivel bracket 3 so that it can freely turn in a horizontal plane for steering the boat. The swivel bracket 3 is rotationally connected via a rotary shaft to the supporting bracket 4 which is secured to boat 2. This allows also the external propelling device 1 to turn in a vertical plane thus pivoting rotary shaft 5. To support the external propelling device 1 at an optimum installation angle and allow for the tilt, a tilt damper 10 is provided so that it connects the swivel bracket 3 to the support bracket 4. When the tilt damper 10 extends, the external propelling device 1 rises upward pivoting the rotary shaft 5 and dips when the tilt damper 10 retracts.

Figure 2:
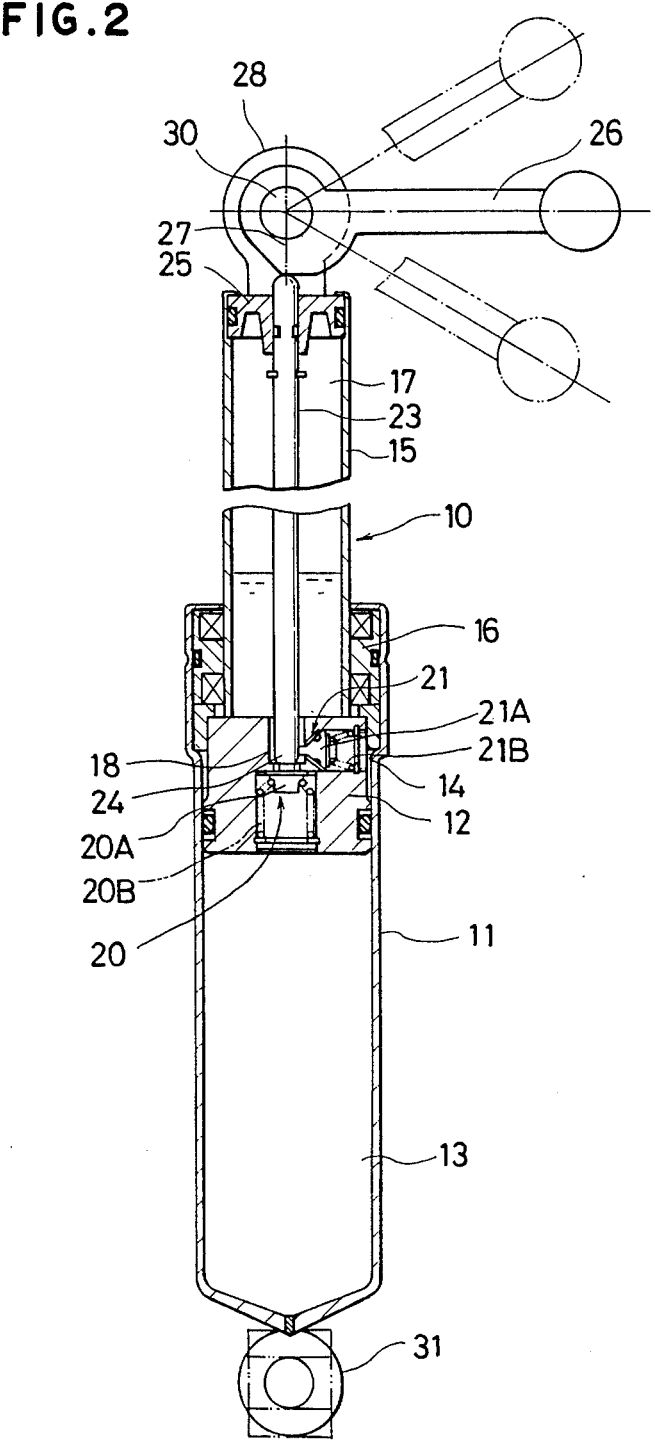
FIG. 2 is the sectional view of the first preferred embodiment of the tilt damper related to the invention.

FIG. 2 represents the detailed construction of the tilt damper 10 related to the invention. Piston 12 slides freely into cylinder 11 and separates two oil chambers 13 and 14 by subdividing the inner space of cylinder 11 into two parts. The hollow end of piston rod 15 is connected to piston 12, while its other end protrudes from the cylinder head 16 of cylinder 11. Hence, there is a retraction-side oil chamber 13 which contracts when the piston rod 15 moves in the direction of retraction and an extension-side oil chamber 14 which contracts when the piston rod 15 moves in the direction of extension, respectively.

The gas chamber 17 is found inside the hollow piston rod 15 and contains pressurized gas, while the gas chamber 17 itself is connected to oil chambers 13 and 14 via the passage 18 provided for the piston 12. The oil loaded in the tilt damper 10 related to the invention fills the oil chambers 13 and 14. The charge of oil is determined so that part of it can remain in the gas chamber 17 even when the piston rod 15 is fully extended. The relief valve 20 is installed at a position which connects passage 18 to the retraction-side oil chamber 13. Likewise, the check valve 21 is installed at a position which connects passage 18 to the extension-side oil chamber 14.

To securely prevent oil from flowing back to the gas chamber 17 from the oil chambers 13 and 14, valves 20A and 21B of relief valve 20 and check valve 21 are loaded by springs 20B and 21B respectively so that these valves can be adjusted to incide with their seats. Only when the inner pressure of gas chamber 17 is higher than that of oil chamber 13 by an amount higher than the predetermined value, the relief valve 20 can open to allow oil to flow from gas chamber 17 to oil chamber 13. The operating rod 23 is provided through the center of the hollow end of piston rod 15. The conical portion 24 at the tip of the operating rod 23 selectively and compulsorily releases the relief valve 20 and check valve 21. In particular, the relief valve 20 and check valve 21 are arranged on perpendicular lines. When the operating rod 23 is at the position shown in FIG. 2, only the check valve 21 is acted upon by the lateral surface of the conical portion 24 so that it opens. If further pressure were applied to the operating rod 23, the relief valve 20 is also acted upon by the tip of the conical portion 24 so that it also opens. Conversely, if the operating rod 23 were pulled outwards from the position shown in FIG. 2, then the conical portion 24 frees both valves 20 and 21 which in turn close under the load of springs 20B and 21B.

The operating rod 23 while airsealed penetrates the upper lid 25 of the hollow end of piston rod 15, while its tip remains in contact with the cam 27 provided for the operating handle 26. Using the installation bracket 28 at the tip of piston rod 15, the operating handle 26 is coaxially held by the supporting shaft 30. The surface of cam 27 is designed according to part of the external circumference of the base of the supporting shaft 30 to allow the distance to the pivot of the supporting shaft 30 to sequentially vary. Reference numeral 31 shown in FIG. 2 is the bracket used for installing cylinder 11. Tilt damper 10 is connected to both the external propelling device 1 and the boat 2 by means of installation brackets 28 and 31.

Next, the functional operation of the tilt damper related to the invention is described below.

To vertically turn the external propelling device 1, first, the operator turns the operating handle 26 in the downward direction as shown by the imaginary figure in FIG. 2, then, using cam 27, he fully inserts the operating rod 23. This opens fully the relief valve 20 and check valve 21 so that the oil chambers 13 and 14 can be connected with the gas chamber 17.

The effective area of oil chamber 13 under pressure from piston 12 is wider than that of oil chamber 14 by a specific amount corresponding to the sectional area of piston rod 15. As a result, piston 12 moves in the direction of extension of piston rod 15 in response to the gas pressure of gas chamber 17. Consequently, when raising the position of the external propelling device 1 above the water line, the operator can easily turn the external propelling device 1 by effectively applying the extension force of the tilt damper 10 as an aiding means.

While the relief valve 20 and check valve 21 remain open, oil flows freely through oil chamber 13 and 14. This allows piston 12 to move freely itself, and thus, the operator can adjust correctly the position of the external propelling device 1 for an optimum angle in water using a negligible force of his own.

After correctly setting the external propelling device 1 to the predetermined angle position, the operator raises the operating handle 26 back to the normal position shown by solid line in FIG. 2, so that the operating rod 23 under the load of spring 20B rises following cam 27 and the relief valve 20 closes. When these operations are under way, the lateral surface of the conical portion 24 acts upon the check valve 21, which as a result, remains open. As a consequence the tilt damper 10 will be locked by oil pressure and cannot move in the retraction direction. However, the tilt damper 10 is held in a condition in which it is allowed to move in the direction of extension.

When sailing, the propelling force from the external propelling device 1 and the compressive force generated by the weight of the tilt damper are both applied to the tilt damper 10. As a result, if the movement of piston 12 in the direction of the retraction of piston rod 15 could securely be restrained substantially, the position of the external propelling device 1 can be held stable at the predetermined ideal angle.

If unwanted impact (overload) were applied to the tilt damper 10 in the direction of extension as a result of a collision with a boat or obstacle like lumber floating in water for example, then, the tilt damper 10 allows oil to flow out of extension-side oil chamber 14 through check valve 21. This causes the piston 12 to move, thus allowing piston rod 15 to provisionally extend before eventually absorbing the shock. Simultaneously, as a result of the movement of piston 12, the retraction-side oil chamber 13 expands and generates a negative pressure. However, if the differential pressure against the inner pressure of the gas chamber 17 does not exceed the predetermined operating pressure of the relief valve 20, the relief valve 20 remains closed. As a result, the tilt damper 10 extended by the impact is relieved of the load before eventually returning to its original position by virtue of stability which is generated by the negative pressure of the retraction-side oil chamber 13 and applied to piston 12 in the direction of retraction.

When the relief valve 20 is opened due to an impact incurred by the external propelling device 1, oil flows out of the retraction-side oil chamber 13 from the gas chamber 17. This allows the piston rod 15 to smoothly extend, and at the same time, promotes the shock absorption efficiency. Consequently, even the slightest shock can be effectively absorbed by the delivery of low oil pressure to the relief valve 20. In this case, the piston rod 15 does not return to its original position. To compensate for this, the operator should again adjust the angle of the tilt damper 10 by compulsorily opening both the relief valve 20 and the check valve 21 by through the operating handle 26.

The shock-absorbing characteristic of the tilt damper 10 varies according to the predetermined operating pressure of the relief valve 20. The automatic stability of the damper is improved by raising the predetermined operating pressure of the relief valve 20. If the predetermined pressure were reduced, the tilt damper will lose its automatic stability. Instead, it will absorb the slightest shock.

When reversing direction of rotation of the external propelling device 1 for an astern maneuver or brake the forward movement of the boat, the propelling force of the external propelling apparatus 1 acts in the opposite direction, thus causing the tilt damper 10 to be subjected to a load acting in the direction of extension.

When reversing the direction of rotation of the external propelling device 1, first, the operator raises the position of handle 26, then, he turns cam 27 to the lowest position. This allows the operating rod 23 to be disengaged from the mechanism under the action of the pressure inside the tilt damper 10, and as a result, the relief valve 20 and check valve 21 will close. Consequently, oil cannot flow out of oilchambers 13 and 14, and thus, piston 12 cannot move in either direction. In other words, the movement of the piston rod is totally locked by the oil pressure. As a result, when reversing the direction of rotation of the external propelling device 1, even if the tilt damper 10 is subjected to a load in the direction of extension, the tilt damper 10 does not extend, thus allowing the external propelling device 1 to be securely held at a stationary position while all operations are performed in a stable manner even when maneuvering astern or braking the forward motion of the boat.

Figure 3:
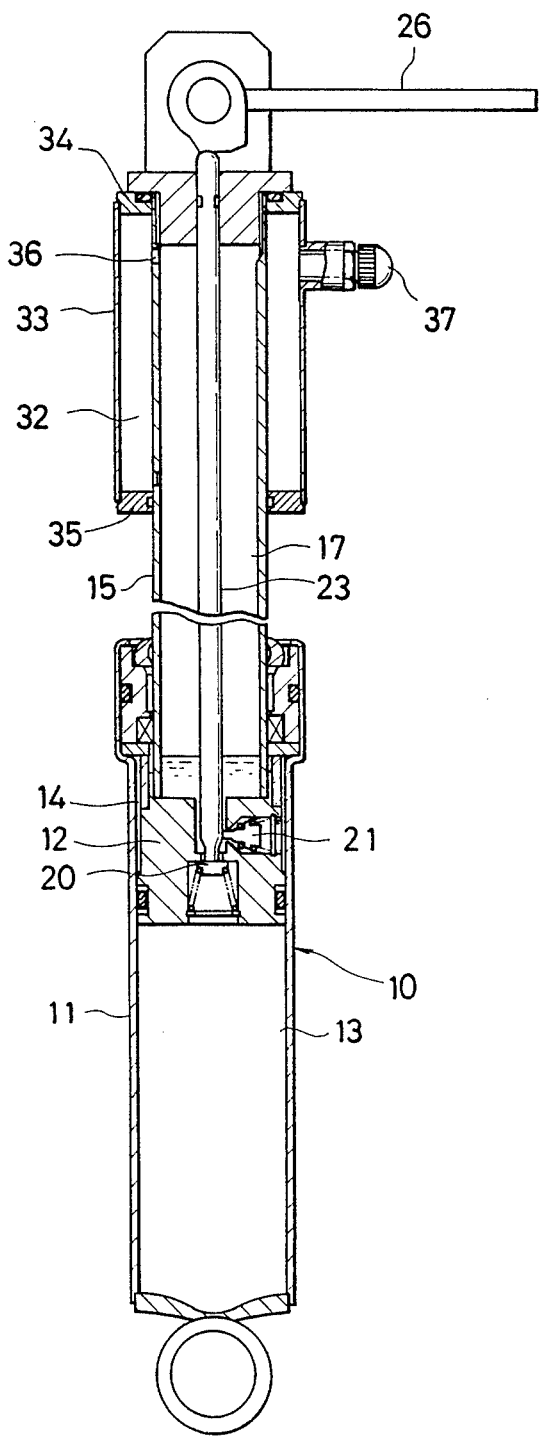
FIG. 3 is the sectional view of another preferred embodiment of the tilt damper related to the invention.

Next, another preferred embodiment of the tilt damper shown in FIG. 3 is described below. The tilt damper shown in FIG. 3 is provided with a gas chamber having an increased capacity by the additional installation of the second gas chamber 32 in connection with the first gas chamber 17 attached to the external periphery of the tip portion of the hollow piston rod 15. The second gas chamber 32 is formed by the enclosure the upper and lower surfaces of the cylindrical member 33 arranged outside piston rod 15 with lid members 34 and 35. The first and second gas chambers 17 and 32 are interconnected through hole 36 of the lateral surface of piston rod 15. Reference numeral 37 is a pneumatic valve which opens when sealing gas into these gas chambers. When piston rod 15 rises, the total capacity of the oil chambers 13 and 14 increases. Oil flows from gas chamber 17 to oil chambers 13 and 14 to lower the oil surface level. This in turn lowers the oil pressure inside the tilt damper. When the oil pressure inside the damper decreases, the force which supports the tilt damper also decreases. This also lowers the additional force generated by the gas pressure when raising the external propelling device 1 above the water line. The less the capacity of gas chamber 17, the greater the variation of pressure inside it. To sufficiently compensate for the capacity of gas chamber 17, the second gas chamber 32 connected to the first gas chamber 17 is provided. Consequently, the rate of varying the capacity of the gas chamber caused by a viable oil pressure level generated by the extension and retraction of the piston rod 15 eventually decreases. Accordingly, even when the tilt damper 10 is fully extended, a stable supporting force can be safely generated independently of the stroke position. Since the second gas chamber 32 is provided on the external periphery of the tip portion of piston rod 15, the capacity of the gas chamber can be increased without extending the total length of the tilt damper 10.

Figure 4:
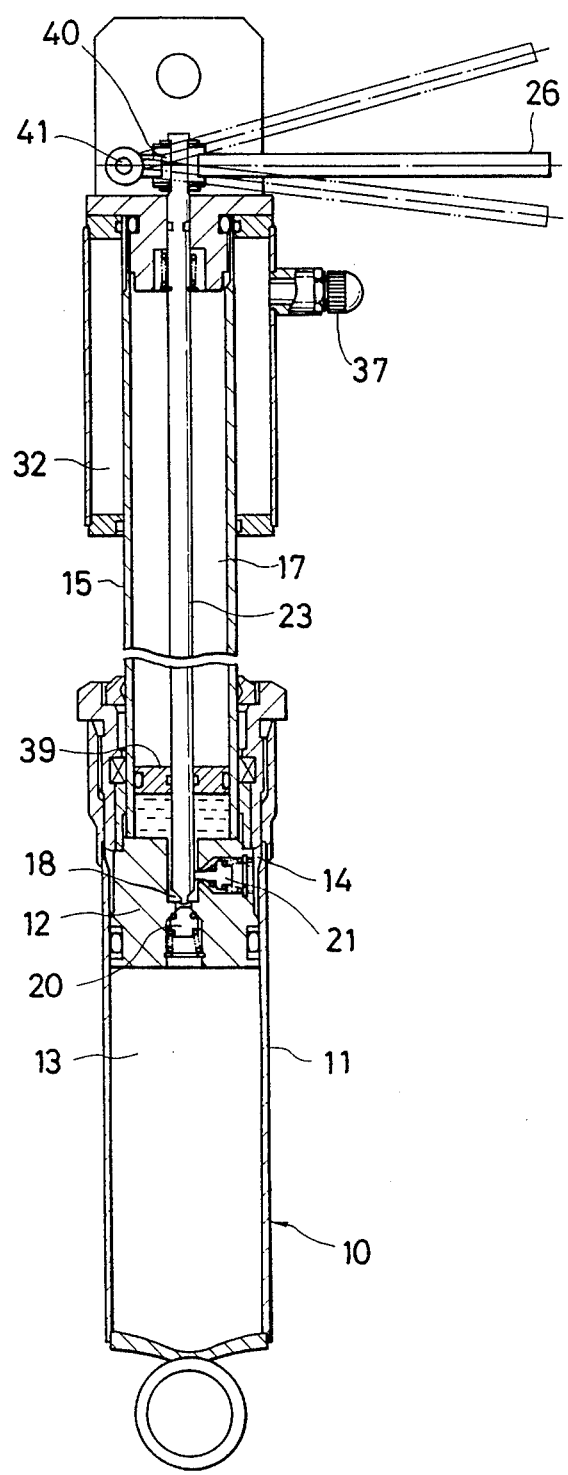
FIG. 4 is the sectional view of another preferred embodiment of the tilt damper related to the invention.

FIG. 4 represents another preferred embodiment of the tilt damper related to the invention. A free piston 39 is added for separating the oil from the gas inside the first gas chamber 17, while this free piston 39 slides freely inside the cylinder. The free piston 39 prevents oil from mixing with gas, thus eventually stabilizing the damping characteristic. The operating handle 26 driving the operating rod 23 is fixed by the flange slit 40 at the tip of the operating rod 23 so that this operating rod 23 can move forward and backward by rotating the operating handle 26 and pivoting fulcrum 41.

Figure 5:
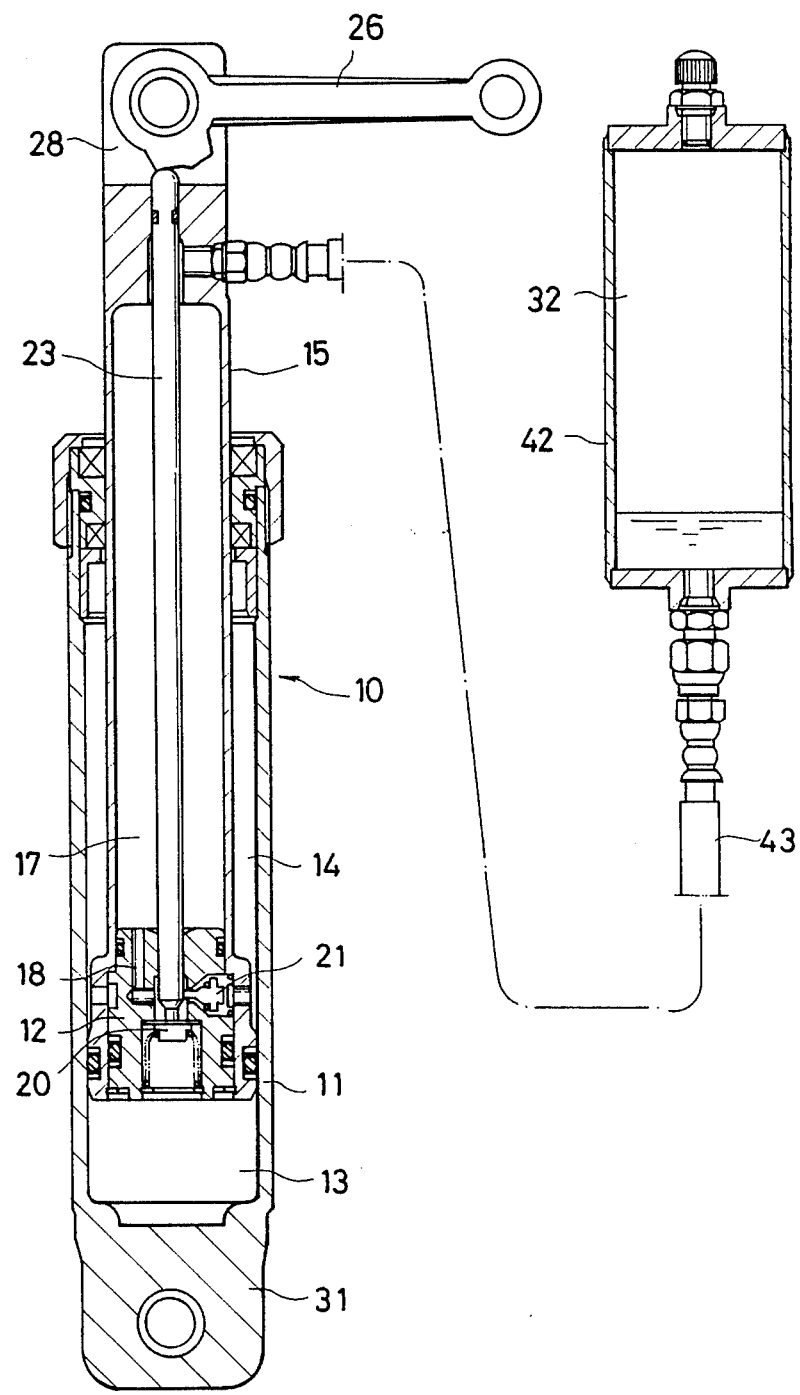
FIG. 5 is the sectional view of another preferred embodiment of the tilt damper related to the invention.

FIG. 5 represents another preferred embodiment of the tilt damper related to the invention. Tank 42 constituting the second gas chamber 32 is installed separately from the tilt damperd 10, while they are interconnected by the first gas chamber 17 and hose 43. Tank 42 can be installed independently at any location. The capacity of tank 42 can be increased as required. According to this arrangement, when tilting a large and heavy external propelling device, a powerful and stable aiding force can be safely generated.

Bracket 28 is integrally secured to the tip portion of hollow end of the piston rod 15, and likewise, bracket 31 is integrally secured to the tip portion of the damper cylinder 11. These components are formed integrally of a cast alloy of aluminum by an extraction-molding process featuring a high resistance to corrosion, thus perfectly resistant to the corrosion caused by brine. The tip portion of piston rod 15 is coupled to piston 12 incorporating a valve unit, which facilitate the assembly and manufacturing processes. Piston 12 is made from a material different from that used for piston rod 15.

Figure 6:
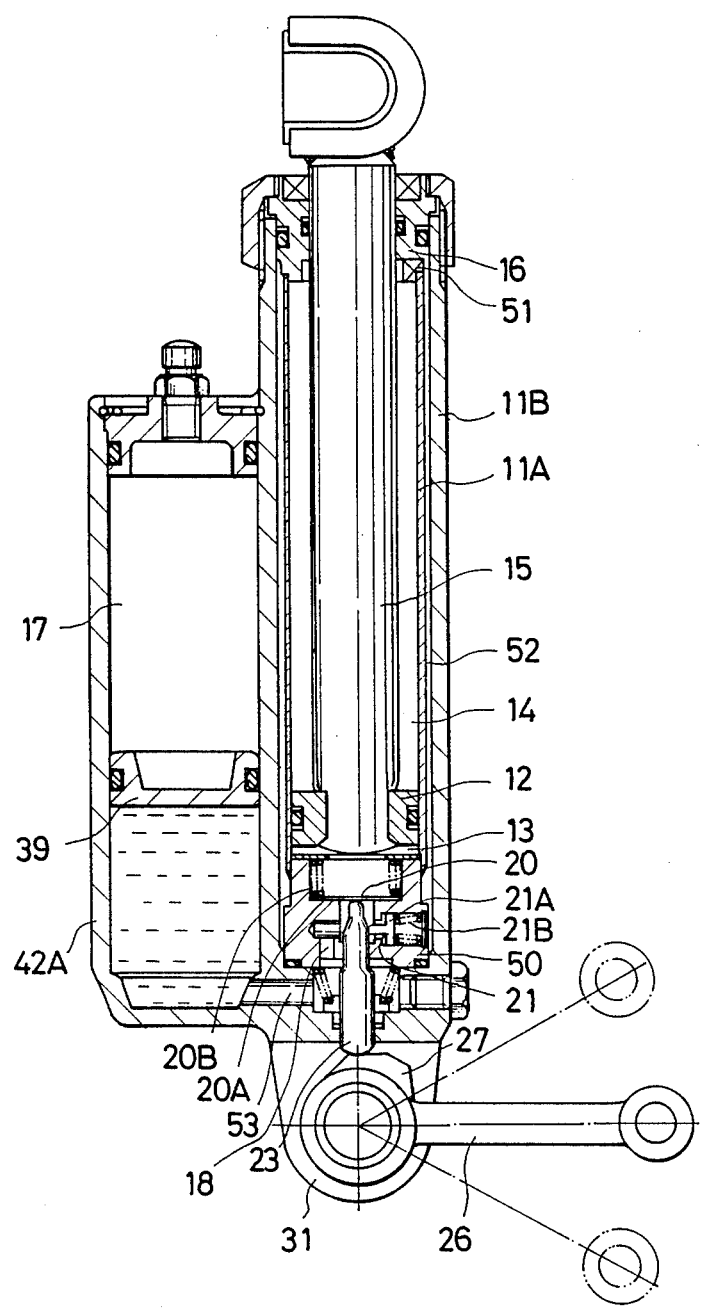
FIG. 6 is the sectional view of another preferred embodiment of the tilt damper related to the invention.

FIG. 6 is another preferred embodiment of the tilt damper related to the invention. Piston rod 15 is not hollow, but it is made of a solid member. This possible arrangement has double cylinders 11A and 11B. The oil chambers 13 and 14 are generated inside the inner cylinder 11A by means of piston 12. The base 50 at the bottom of the damper cylinder 11 is equipped with a relief valve 20 and a check valve 21 which are respectively opened and closed by the operating rod 23. The operating rod 23 is provided and penetrates the base 50 in the axial direction, where it ascends and descends under the action of cam 27 of the operating handle 26 which is coaxially attached to the cylinder bracket 31.

The expansion-side oil chamber 14 is connected to a ring-shaped passage 52 formed between the damper cylinders 11A and 11B through a cutout portion 51 of cylinder head 16. The ring-shaped passage 52 is connected to the upper port of the check valve 21. Tank 42 incorporating the gas chamber 17 is provided integrally on the lateral surface of the external cylinder 11B. The passage 53 connected to passage 18 of base 50 is provided at the bottom of tank 42A. When the piston rod 15 moves in the direction of extension, oil from the oil chamber 14 flows through the check valve 21 from the ring-shaped passage 52. Oil eventually flows into the gas chamber 17 through passages 18 and 23.

Figure 7:
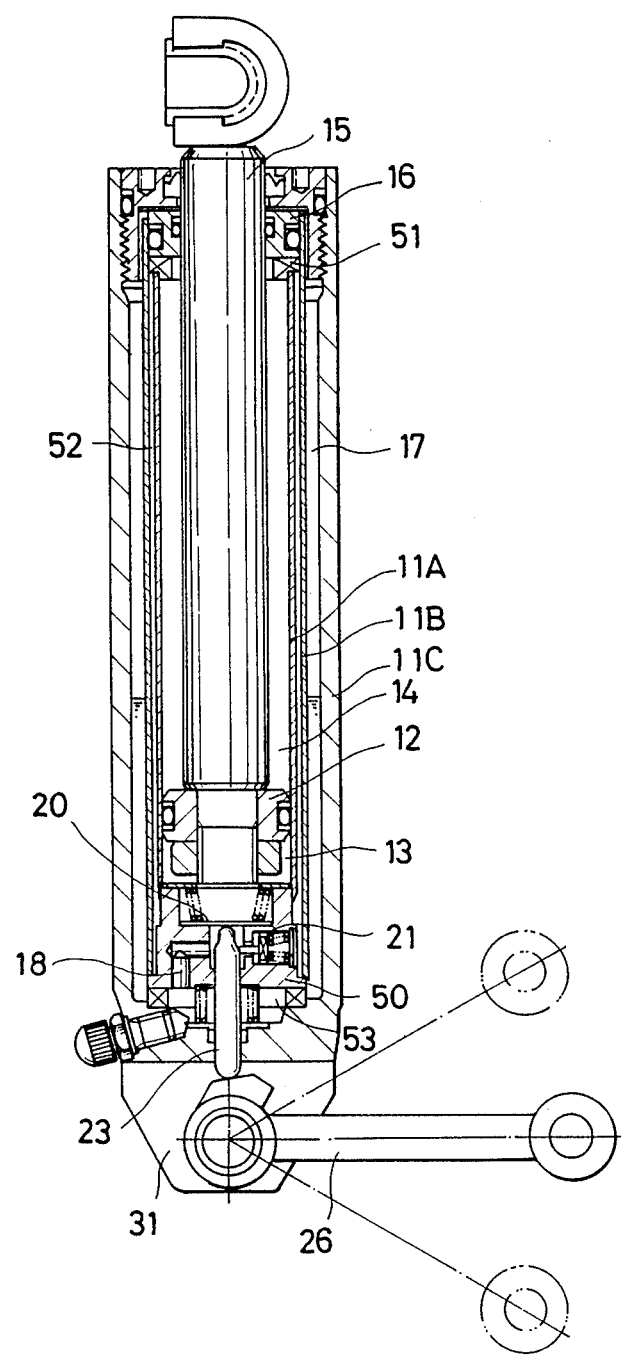
FIG. 7 is the sectional view of another preferred embodiment of the tilt damper related to the invention.

FIG. 7 is a still further preferred embodiment of the tilt damper related to the invention. A gas chamber 17 is provided outside cylinder 11B. Cylinder 11C is coaxially arranged outside cylinders 11A and 11B. The gas chamber 17 is connected to the relief valve 20 and check valve 21 through the passage 53 of base 50 and another passage 18. The provision of the gas chamber 17 in the external periphery of damper cylinders 11A and 11B allows the formation of a gas chamber having a predetermined capacity without extending the total length of the tilt damper.

It should be understood that the scope and spirit of the invention are by no means confined to those preferred embodiments described above, but it is quite obvious for those skilled in this field that the invention can be modified for improvement within the scope of the technical thought constituting this invention.

What is claimed is:

1. A tilt damper for a propelling device attached to a boat comprising a cylinder means containing a supply of oil, a piston means dividing said cylinder means into a first oil chamber and a second oil chamber and movable in said cylinder means to extend and retract relative to said cylinder means, a gas chamber means containing a pressurized gas, first valve means operable to provide communication between said gas chamber means and said first oil chamber, second valve means operable to provide communication between said first and second oil chamber means, and an operating member movable between a plurality of operable positions for opening said first and second valve means, one of said operable positions being a first operable position which opens said first valve means to provide communication between said gas chamber means and said first oil chamber while said second valve means is closed such that said pressurized gas provides cushioning of said first oil chamber and thereby cushioning of extension of said piston means while precluding retraction of said piston means, another of said operable positions being a second operable position which opens both said first and second valve means to provide communication between said first and second oil chambers and between said gas chamber means and said first and second oil chambers such that the pressurized gas extends said piston means, said operating member having a third operable position in which both said first and second valve means are closed to thereby preclude extension and retraction of said piston means.

2. A tilt damper according to claim 1, wherein said second valve means comprises a second valve member and a second spring, said second spring biasing said second valve member in a closed position, said second valve means being operable to open by overcoming the bias of said second spring when an extension shock load exceeding a predetermined value is applied to said piston means such that when said operating member is in said first operable position, said second valve means functions as a relief valve to permit extension of said piston means to relieve shock extension loads above said predetermined valve.

3. A tilt damper according to claim 1, wherein said operable member is operated by the operator of said boat to move said operable member to said second operable position to effect extension of said piston means until the desired extended position of said piston means is reached, said operating member being operated by the operator of said boat to move said operating member from said second operable position to said first operable position when said desired extended position of said piston means has been reached to thereby retain said piston means in said desired extended position.

4. A tilt damper according to claim 3, wherein said piston means is movable from said desired extended position to a further extended position under cushioning conditions of said pressurized gas when encountering an extension overload, said piston means automatically returning from said further extended position to said desired extended position when said extension overload has been removed.

5. A tilt damper according to claim 1, wherein said first and second valve means each have operating axes which are mutually perpendicular.

6. A tilt damper according to claim 1, wherein said cylinder means has a longitudinal cylinder axis, said operating member being an elongate member having a longitudinal member axis, said second valve means having a valve operating axis, said cylinder axis being coincident with said member axis and with said valve axis of said second valve means.

7. A tilt damper according to claim 1, wherein said cylinder means is designated a cylinder structure means and said piston means is designated a piston structure means, said first and second valve means being disposed in one of said structure means, said first valve means having a first valve member movable along a first valve axis when moving between its closed and open positions, said second valve means having a second valve member movable along a second valve axis when moving between its closed and open positions, said first valve axis being perpendicular to said second valve axis.

8. A tilt damper according to claim 7, wherein said cylinder means has a longitudinal cylinder axis, said second valve axis being coincident with said cylinder axis.

9. A tilt damper according to claim 8, wherein said operating member has a longitudinal member axis which is coincident with said cylinder axis.

10. A tilt damper according to claim 7, wherein said first valve means comprises a first passage in said one structure means having a first passage axis coincident with said first valve axis, said second valve means further comprising a second passage in said one structure means having a second passage axis coincident with said second valve axis, said one structure means having a member passage through which said operating member is longitudinally movable, said member passage having a member passage axis coincident with said second passage axis, said first and second passages each communicating with said member passage.

11. A tilt damper according to claim 10, wherein said cylinder means has a longitudinal cylinder axis, said operating member having a longitudinal member axis, said second passage axis being coincident with said cylinder axis and said member axis.

12. A tilt damper according to claim 1, wherein said operating member has a longitudinal end which engages said second valve means to open said second valve means when in said second operable position.

13. A tilt damper according to claim 1, wherein said operating member has a conical end portion operable to engage and open said first valve means when said operating member is moved from said third to said first operable position.

14. A tilt damper according to claim 1, wherein said operating member has a longitudinal member axis, said operating member being axially movable along said member axis when being moved between said first, second, and third operable positions.

15. A tilt damper according to claim 14, further comprising cam means operable to engage said operating member and control movement of said operating member between said first, second and third operable positions.

16. A tilt damper according to claim 14, wherein said cylinder means has a longitudinal cylinder axis which is coincident with said member axis.

17. A tilt damper according to claim 1, wherein said first valve means comprises a first valve member and a first spring, said first spring biasing said first valve member in a closed position.

18. A tilt damper according to claim 1, wherein said first and second valve means are in said cylinder means.

19. A tilt damper according to claim 1, wherein said first and second valve means are in said piston means.

20. A tilt damper according to claim 1, wherein said cylinder means comprises an inner cylinder wall in which said piston means operates and annular chamber means defining an annular chamber disposed radially outwardly of said cylinder wall, said gas chamber being disposed in said annular chamber.

21. A tilt damper according to claim 20, wherein cylinder means further comprises annular passageway means disposed radially outwardly of said cylinder wall and radially inwardly of said annular chamber, said annular passageway providing communication between said first valve means and said second oil chamber.

22. A tilt damper according to claim 1, wherein said piston means comprises a piston rod having a hollow interior, said operating member extending axially through said hollow interior of said piston rod.

23. A tilt damper according to claim 1, wherein said piston means comprises a piston rod having a hollow interior, said gas chamber means being disposed within said hollow interior of said piston rod.

24. A tilt damper according to claim 1, wherein said piston means comprises a piston rod having a hollow interior, said gas chamber means having one part disposed within said hollow interior of said piston rod, said gas chamber means having another part carried on the outside of said piston rod, and interconnecting means communicating between said first and second parts of said gas chamber means.

25. A tilt damper according to claim 1, wherein said piston means comprises a piston rod having a hollow interior, a piston member movable in said hollow piston rod and dividing said hollow interior into a first part and a second part, said gas chamber means being disposed in said first part, said oil being disposed in said second part.

26. A tilt damper according to claim 1, wherein piston means comprises a piston rod having a hollow interior, said gas chamber means having one part disposed within said hollow interior of said piston rod, said gas chamber having another part separate from said piston means, and conduct means communicating said first and second parts of said gas chamber means.

27. A tilt damper for a propelling device attached to a boat comprising a cylinder means containing a supply of oil, a piston means dividing said cylinder means into a first oil chamber and a second oil chamber and movable in said cylinder means to extend and retract relative to said cylinder means, a gas chamber means containing a pressurized gas, first valve means operable to provide communication between said gas chamber means and said first oil chamber, second valve means operable to provide communication between said first and second oil chamber means, and an operating member movable between a plurality of operable positions for opening said first and second valve means, one of said operable positions being a first operable position which opens said first valve means to provide communication between said gas chamber means and said first oil chamber while said second valve means is closed such that said pressurized gas provides cushioning of said first oil chamber and thereby cushioning of extension of said piston means while precluding retraction of said piston means, another of said operable positions being a second operable position which opens both said first and second valve means to provide communication between said first and second oil chambers and between said gas chamber means and said first and second oil chambers such that the pressurized gas extends said piston means, said operating member being operated by the boat operator to move said operating member to said other operable position to thereby effect extension of said piston means until a desired extended position of said piston means is reached, said operating member being operated by said boat operator to move said operating member from said other operable position to said one operable position to discontinue further extension of said piston means when said desired extended position has been reached, whereby said boat operator can thereby attain said desired extended positions by operating said operating member.

28. A tilt damper according to claim 27, wherein said second valve means includes a spring, said second valve means being biased in its closed position by said spring, said second valve means being operable to open by overcoming the bias of said spring when an extension shock load exceeding a predetermined volume is applied to said piston means such that when said operating member is in said one operable position, said second valve means functions as a relief valve to permit extension of said piston means to relieve shock extension loads above said predetermined value.

29. A tilt damper according to claim 27, wherein when said operable member is in said one operating position, said piston means is temporarily movable from said desired extended position to a further extended position under cushioning conditions of said pressurized gas when encountering a shock extension overload, said piston means automatically returning from said further extended position to said desired extended position when said shock extension overload is removed.

30. A tilt damper according to claim 29, wherein said second valve means remains closed when said piston means is temporarily moved to said further extended position to thereby provide a negative pressure in said second oil chamber, said negative pressure being operable to return said piston means from said further extended position to said desired extended position when said shock extension overload has been removed.

31. A tilt damper for a propelling device attached to a boat comprising a cylinder means containing a supply of oil, a piston means movable in said cylinder means and dividing said cylinder means into a first oil chamber and a second oil chamber, said piston means having a piston rod which extends and retracts as said piston means moves in said cylinder means, a gas chamber means containing a pressurized gas, first valve means operable between a closed and open position, said first valve means when in its open position providing communication between said gas chamber means and said first oil chamber, second valve means operable between open and closed positions, said second valve means when in its open position providing communication between said first and second oil chamber means, and an operating member movable between a plurality of operable positions for opening said first and second valve means, one of said operable positions being a first operable position which opens said first valve means to provide communication between said gas chamber means and said first oil chamber while said second valve means is closed such that said pressurized gas provides cushioning of said first oil chamber and thereby cushioning of extension of said piston means while precluding retraction of said piston means, another of said operable positions being a second operable position which opens both said first and second valve means to provide communication between said first and second oil chambers and between said gas chamber means and said first and second oil chambers such that the pressurized gas extends said piston means, said operating member having a third operable position in which both said first and second valve means are closed to thereby preclude extension and retraction of said piston means.

* * * * *